United States Patent [19]

Wagner et al.

[11] 4,322,504

[45] Mar. 30, 1982

[54] RESIN BINDERS AND PROCESS FOR PREPARING THEM

[75] Inventors: Reinhard Wagner, Naurod; Gerhard Werner, Glashütten; Günther Hencken, Steinbach; Christoph Just, Glashütten, all of Fed. Rep. of Germany

[73] Assignee: Hoechst Aktiengesellschaft, Fed. Rep. of Germany

[21] Appl. No.: 186,137

[22] Filed: Sep. 11, 1980

Related U.S. Application Data

[63] Continuation of Ser. No. 724,003, Sep. 16, 1976, abandoned.

[30] Foreign Application Priority Data

Sep. 18, 1975 [DE] Fed. Rep. of Germany ....... 2541641
Aug. 28, 1976 [DE] Fed. Rep. of Germany ....... 2638857
Sep. 23, 1976 [DE] Fed. Rep. of Germany ....... 2639667

[51] Int. Cl.$^3$ .............................................. C08L 67/06
[52] U.S. Cl. ...................................... 525/7.1; 525/38; 525/39; 525/41; 525/48; 528/298
[58] Field of Search ....................... 525/38, 39, 41, 48; 528/298; 260/22 CB

[56] References Cited

U.S. PATENT DOCUMENTS

| | | | |
|---|---|---|---|
| 3,553,294 | 1/1971 | McGary, Jr. et al. | 260/871 |
| 3,585,254 | 6/1971 | Buck | 260/869 |
| 3,882,006 | 5/1975 | Watanabe et al. | 260/861 X |
| 3,898,144 | 8/1975 | Rudolph et al. | 260/861 X |
| 3,904,563 | 9/1975 | Shingai et al. | 260/861 X |
| 4,035,320 | 7/1977 | Lawson | 260/861 X |

FOREIGN PATENT DOCUMENTS 48-47595 7/1973 Japan .
1407069 9/1975 United Kingdom .

OTHER PUBLICATIONS

Kirk–Othmer, *Encyclopedia of Chemical Technology*, 2nd ed. vol. 20 (1969) pp. 816–822.
*Encyclopedia of Polymer Science and Technology*, vol. 11 (1969) pp. 153–164.

*Primary Examiner*—Paul Lieberman
*Attorney, Agent, or Firm*—Quaintance & Murphy

[57] ABSTRACT

An unsaturated polyester suitable as a binder which comprises a reaction product of
(A) an acid component comprising one or a mixture of $\alpha,\beta$-mono-olefinically unsaturated dicarboxylic acids or polycarboxylic acids free from polymerizable carbon-carbon multiple bonds or functional derivatives thereof,
(B) a polyhydric alcohol,
(C) a polycyclic compound containing a norbornane ring system and having one or more identical substituents selected from carboxyl, hydroxy and amino groups, and
(D) an acrylic compound which is capable of condensing with at least one of components (A) to (C), i.e. a hydroxyalkyl ester of acrylic or methacrylic acid having up to 3 carbon atoms in the hydroxyalkyl groups, or -alkylol-acryl- or methacrylamides containing up to 4 carbon atoms in the alkylol group or mixtures thereof and a process of their preparation.

18 Claims, No Drawings

RESIN BINDERS AND PROCESS FOR PREPARING THEM

This is a continuation of copending application Ser. No. 724,003, filed Sept. 16, 1976, now abandoned.

The invention relates to radiation hardenable binders suitable for coating systems, in particular solvent-free printing inks.

In general coating systems of this kind comprise a binder which generally contains ethylenic carbon-carbon double bonds, a reactive diluent which is copolymerisable therewith, at least one sensitizer and usually, in the case of printing inks, a pigment.

Coating systems of this kind should desirably harden, i.e. cross-link, rapidly under the effect of high energy radiation, preferably ultra-violet light, and in the case of printing inks should form a hard but flexible film with good adhesion, high gloss, good pigment wetting and thus a high colour intensity. Furthermore, the inks should be capable of being processed satisfactorily in printing machines, particularly offset machines, and should have an adequate storage stability.

The use of radiation hardenable ethylenically unsaturated resins in coating compositions, adhesives and printing inks is known. Under the effect of high energy radiation, particularly when mixed with photosensitizers, these resins polymerise. However, the standard commercial products frequently are unsatisfactory with regard to their pigment wetting and storage stability, in that they do not wet pigments sufficiently or they thicken when stored therewith. Moreover, the inks produced therefrom sometimes have poor printing properties. Thus, for example, acrylated epoxy resins tend to "pull", i.e. the printing ink sticks to the rollers or to the rollers and paper, and this can sometimes result in tearing of the paper.

Hardenable synthetic resins in admixture with acrylamide compounds often have the disadvantage that they have too high a viscosity. They therefore have to be mixed with a relatively large amount of reactive diluent as a result of which the drying speed suffers. Frequently, crystallisation and phase separation occurs in the printing ink making processing more difficult or impossible.

Morever, systems based on polyacrylates obtained by reacting polyhydric alcohols with dicarboxylic acids and then reacting the product with acrylic or methacrylic acid have been proposed. These systems generally have more satisfactory processing characteristics and have a high gloss but they do tend to have certain disadvantages, namely their drying times are too long and they thus do not meet the requirements of modern practice.

The binders for radiation hardenable polyester systems described hitherto generally have at least one easily polymerisable carbon-carbon double bond, i.e. they are $\alpha,\beta$-olefinically unsaturated. However, unsaturated polyester resin systems have also been proposed in which the double bond is in an isocyclic ring. Typical resins of this kind have a linear construction and contain substituted or unsubstituted unsaturated bicyclo-(2,2,1)-heptenyl-(2) groups either in the polymer chain or in side chains. However, when subjected to radiation, it is found that these resins harden unsatisfactorily.

Further unsaturated polyesters, hardenable by free radical polymerisation mechanisms, are known which are prepared from polyhydric alcohols and $\alpha,\beta$-olefinically unsaturated polycarboxylic acids, optionally a proportion of these unsaturated acids being replaced by saturated aliphatic and/or aromatic polycarboxylic acids, and which additionally comprise bi- or tricyclic dihydroxy compounds containing an endomethylene group, for example, dimethylol dicyclopentadiene and dicyclodicarboxylic acids which contain an endomethylene group, e.g. hexachloroendomethylene tetrahydrophthalic acid. Unsaturated polyesters are also known wherein the diol rather than the acid components are partially replaced by di- or tricyclic diols, for example dimethylol bicyclo-(2,2,1)-heptane and dimethylol tricyclo-(5,2,1,0$^{2,6}$)-decane. The presence in the unsaturated polyester of these compounds containing di- or tricyclic endomethylene groups brings about an increase in the hardening speed and thus a reduction in the time taken to reach a non-tacky state.

Instead of the unsaturated di- or tricyclic components, it has also been proposed to use polyesters obtained by reacting a saturated dicyclopentadiene derivative, e.g. 3(4),8(9)-dihydroxymethyltricyclo-(5,2,1,0$^{2,6}$)-decane, with unsaturated dicarboxylic acids. These polyesters may also be processed, like styrene copolymers, to form solvent-free rapid drying enamels, but cannot be subjected to UV hardening.

Resins hardenable by the effect of high energy radication have also been described which consist of a mixture (A) of an unsaturated polyester, (B) a norbornene carboxylic acid derivative and (C) optionally a copolymerisable vinyl monomer. Component (B) may also be esterified via the acid group with an alcohol containing a tricycloalkylene group e.g. a tricyclo-(5,2,1,0$^{2,6}$)-dec-3-ene group. This mixture polymerises during the hardening process, whilst the copolymerisable monomer is incorporated into the resin.

Although some of the aforementioned binders have found practical application, there is still a search for products having improved properties. Thus, it is desired to improve the processability and shelf life of pigment-containing printing inks and moreover to increase the gloss of the print.

According to the present invention there is provided an unsaturated polyester suitable as a binder which comprises a reaction product of (A) an acid component comprising one or a mixture of $\alpha,\beta$-mono-olefinically unsaturated dicarboxylic acids or polycarboxylic acids free from polymerisable carbon-carbon multiple bonds or functional derivatives thereof, (B) a polyhydric alcohol, (C) a polycyclic compound containing a norbornane ring system and having one or more identical substituents selected from carboxyl, hydroxy and amino groups, and (D) an acrylic compound which is capable of condensing with at least one of components (A) to (C), i.e. a hydroxyalkyl ester of acrylic or methacrylic acid having up to 3 carbon atoms in the hydroxyalkyl groups, or -alkylol-acryl- or methacrylamides containing up to 4 carbon atoms in the alkylol group or mixtures thereof.

The new binders according to the invention are generally hardenable with UV radiation hardenable binders used heretofore. They may be prepared by a process which comprises reacting in a first stage components (A), (B) and (C) to produce a polyester product which is subsequently reacted in a second stage with (D) said acrylic compound which is co-condensable therewith.

The polyester resin intermediate product contains hydroxy groups or carboxyl groups as the reactive groups. In the second stage this polyester resin, which may or may not be unsaturated, undergoes an esterification transesterification or etherification reaction between the reactive groups and the acrylic compound.

Polycarboxylic acids free from aliphatic carbon carbon multiple bonds which may be used as component (A) are, for example, saturated aliphatic and cycloaliphatic polycarboxylic acids with 4 to 13 carbon atoms, e.g. succini acid, dimethylsuccinic acid, adipic acid, azelaic acid, sebacic acid, brassydic acid and hexahydrophthalic acid, and aromatic polycarboxylic acids with 8 or 9 carbon atoms, e.g. the various phthalic acids and trimellitic acid. Mono-olefinically unsaturated dicarboxylic acids which may be used are, for example, aliphatic unsaturated acids with 4 or 5 carbon atoms e.g. maleic, fumaric, itaconic, mesaconic, citraconic and chloromaleic acid.

If desired the polyesters according to the invention can be modified by incorporation of further acid components, in particular benzophenones which are substituted by at least one carboxyl group and then act as internal sensitisers, fatty oils and/or unsaturated fatty acids, those having a conjugated diene system, e.g. 9,11-ricinoleic acid and/or 10,12-linoleic acid; being preferred, and saturated fatty acids which act as internal plasticisers. The proportion of modifying acid components should generally be not more than 30%, preferably up to 20% and particularly up to 10%, based on the total weight of acid component (A).

Preferred polyhydric alcohols which may be used as component (B) are di- to tetrafunctional, saturated or olefinically unsaturated alcohols with up to 15 carbon atoms, e.g. ethanediol, the various propane-, butane-, pentane- and hexane-diols, dimethylolcyclohexane, bis-(4-hydroxycyclohexyl)-methane and -propane, Δ$^{2,3}$-butenediol-1,4, glycerol, trimethylolethane and propane and pentaerythritol. Mixtures of these polynydric alcohols may also be used. Alcohols containing only primary hydroxyl groups are preferred, particularly trimethylolpropane and ethanediol.

Preferred acrylic compounds (D) are β-hydroxyethyl acrylate and p- and γ-hydroxypropyl acrylates and the corresponding methacrylates, and N-methylolacrylamide or -methacrylamide. Condensation of the hydroxyalkyl acrylates also may be effected via transesterification of the polyester intermediates containing hydroxy groups. This however, results in the alcohol group being split off and is thus less preferred. The proportion of acrylic compounds incorporated into the binder is generally from 10 to 50%, preferably more than 20% by weight, based on the polyester resin product of the second step.

Polycyclic compounds which may be used as component (C) of the binder are endocyclic compounds substituted with carboxyl, hydroxy and amino groups, e.g. tricyclo-(5,2,1,0$^{2,6}$)-decan-3(4)-carboxylic acid

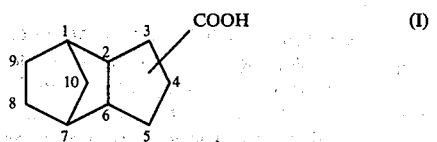

tricyclo-(5,2,1,0$^{2,6}$)-decan-3(4),8(9)-dicarboxylic acid

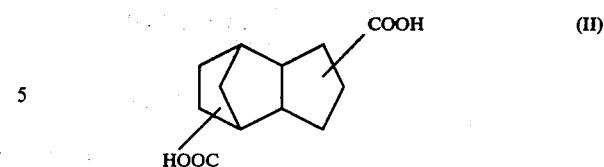

tricyclo-(5,2,1,0$^{2,6}$)-decan-2-carboxylic acid

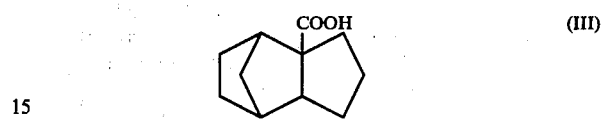

8,8'-di-[tricyclo-(5,2,1,0$^{2,6}$)-decyl]ether-4,4'-dicarboxylic acid

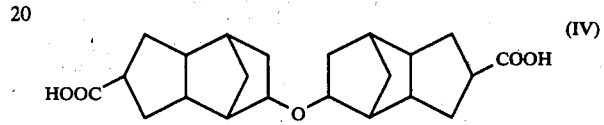

8-hydroxy-4(5)-hydroxymethyl-tricyclo-(5,2,1,0$^{2,6}$)-decane

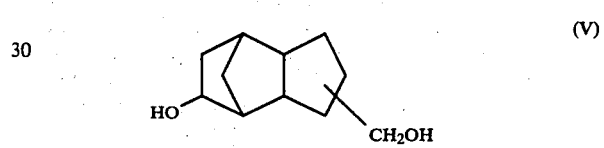

8(9)-hydroxytricyclo-(5,2,1,0$^{2,6}$)-decane

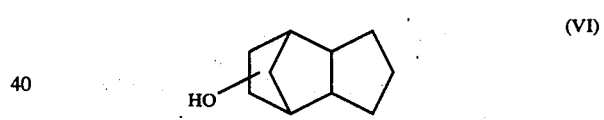

3,4,8(9)-trihydroxytricyclo-(5,2,1,0$^{2,6}$)-decane

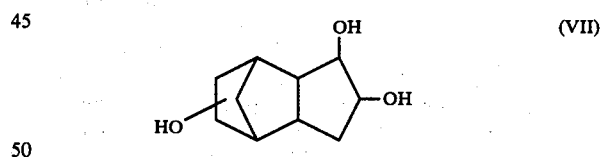

3,4,-dihydroxytricyclo-(5,2,1,0$^{2,6}$)-decane

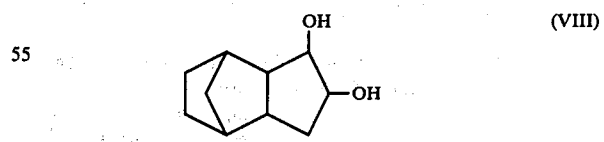

3(4)-hydroxymethyltricyclo-(5,2,1,0$^{2,6}$)-decane

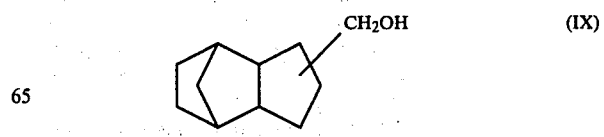

3(4),8(9)-dihydroxymethyltricyclo-(5,2,1,0$^{2,6}$)-decane

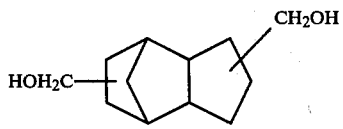

3(4)-aminomethyl-tricyclo-(5,2,1,0$^{2,6}$)-decane

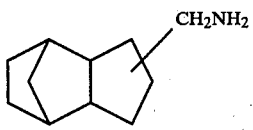

and 3(4),8(9)-diaminomethyl-tricyclo-(5,2,1,0$^{2,6}$)-decane

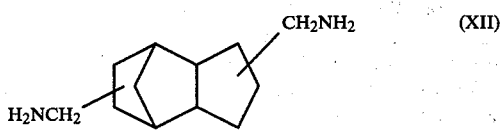

However, polycyclic compounds having a 5-membered ring containing a carbon-carbon double bond fused to the norbarnane ring system, for example 8(9)-hydroxy-tricyclo-(5,2,1,0$^{2,6}$)-dec-3-ene

and 5-hydroxy-tricyclo-(5,2,1,0$^{2,6}$)-dec-3-ene

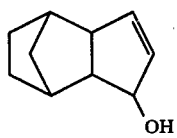

are also suitable for the preparation of the polyester binders according to the invention.

Mixtures of these polycyclic compounds may also be used.

Generally, however, the polycyclic compounds are obtained as isomeric mixtures by the technical process of preparation and are applied in this form to prepare the claimed polyesters.

The content of polycyclic compounds incorporated into the binder is generally at least 0.5%, preferably from 3 to 30% by weight, based on the modified polyester resin obtained in the second step.

As discussed hereinbefore the polyester intermediate product contains hydroxy or carboxyl groups. The polyesters containing hydroxy groups appropriately have hydroxy numbers (determined according to DIN standard 53240) in the range from 100 to 1000, preferably from 200 to 800, most preferably from 400 to 600, and the polyesters containing carboxyl groups have acid numbers (determined according to DIN standard 53402) in the range from 100 to 800, preferably from 200 to 600. In the reaction with the acrylic compounds it is preferred that at least 2%, advantageously from 10 to 35% of the reactive groups do not react. The resin is then easier to prepare since it does not have such a great tendency to cross-linking reactions and thus to undersirable premature gelatinisation and, moreover, has better pigment wetting qualities.

The viscosity of the finished polyester resin binder is generally in the range from 100 to 800 P (20° C., rotoviscosimeter) although it is also possible to use polyesters with higher viscosities, for example those with viscosities of up to 1500 P. Generally, however, a low viscosity is particularly advantageous for the further processing of the polyester.

The polyester resins are appropriately prepared in the first step under the conditions conventionally used for polycondensation resins, e.g. by condensation in a melt, by esterification with azeotropic distillation of the water formed during the reaction, or by transesterification. Towards the end of the esterification, which generally takes place at a reaction temperature in the range from 160° to 250° C., it is advisable to work under reduced pressure, at least for a short time, in order to distil off water, any unreacted volatile starting materials and low molecular weight reaction products. Subsequently, at least one acrylic compound is added to this resin and further esterification or etherification, which may be complete or partial, of the free hydroxy or carboxyl groups takes place under the conditions described further hereinafter.

Whereas, in the first step, no polycondensation catalysts are generally used, in the second step it is convenient to work in the presence of a cataylst, for example sulphuric acid, hydrochloric acid, benzene-sulphonic acid, p-toluenesulphonic acid and methane-sulphonic acid. The catalysts are generally added in quantities of from 0.1 to 5%, preferably 0.5 to 2% by weight, based on the total quantity of the reaction components and are equally suitable for esterification and etherification reactions.

In the second process step, it is also advantageous to work in the presence of an entrainer for example cyclohexane, benzene, toluene, xylene, petroleum fractions with an appropriate boiling range, e.g. n-hexane, trichloroethylene and isopropyl ether. The second stage is preferably effected at a reaction temperature in the range from 70° to 120° C., depending on the type and quantity of retarder used. It is sometimes advisable to work under reduced pressure. The course of the reaction can be monitored by determining the quantity of water formed and the reaction can be regarded as complete when more than 95% of the theoretical quantity of water has been separated off.

In order to avoid polymerisation reactions occurring in the second step in which unsaturated compounds are present a polymerisation inhibitor is generally added, conveniently in a quantity of 0.1 to 5%, preferably 0.5 to 2% by weight, based on the total weight of reaction components. Typical polymerisation inhibitors are, for example, quinone derivatives e.g. hydroquinone and p-benzoquinone, substituted phenols e.g. p-tert.butyl-phenol, p.tert.butyl-pyrocatechol, 2,6-di-tert.butyl-cresol and p-methoxyphenol, amines e.g. diphenylamine, sulphur and sulphur compounds e.g. thiosemicarbazide and phenothiazine.

After the reaction, any azeotropic dehydrating agent used can be distilled off under reduced pressure preferably in a thin-layer or rotary evaporator.

The binders according to the invention may be formulated into coating systems by admixture with one or more reactive diluents, sensitisers and/or pigments.

Such compositions find particular application as printing inks, coating materials, adhesives and, if fillers are also added, as trowelling compounds. The binder imparts to the composition good storage properties and a high hardening speed when irradiated with UV light. Printing ink drying speeds of more than 400 m/min. can for example, be obtained, whilst the print produced therewith has high gloss and colour intensity.

Although UV light is already sufficient to obtain a high hardening speed, irradiation of course may also be effected by means of a more energetic radiation source, e.g. electron beam.

The viscosity of the composition can be adjusted as required for the particular intended use by adding one or more reactive diluents for example in amounts of to up to 60% by weight, based on the total composition. Acrylic and methacrylic acid esters of mono- and/or polyhydric alcohols, e.g. 2-ethylhexanol, ethane diol, the various propane- and butanediols, trimethylolpropane and pentaerythritol, are advantageously used as reactive diluents, alone or in admixture.

A sensitiser may be added to the composition to increase its hardening speed. Typical sensitisers are, for example, ketones e.g. benzoin, benzophenone and Michler's ketone, benzoic acid esters, ethers, ketals, chlorinated aromatic compounds, and anthraquinone derivatives, combinations of benzophenone and Michler's ketone, e.g. in a 1:1 ratio, being preferred. The quantity of sensitisers is generally 2 to 20, preferably 3 to 10% by weight, based on the total composition. The addition or sensitisers can be omitted wholly or partially if an internal sensitisers has already been incorporated into the polyester as decribed herinbefore. As already mentioned, benzophenones substituted with carboxyl groups are preferred for chemical incorporation.

For the preparation of printing inks and pigmented enamels from 5 to 40%, preferably 8 to 20% by weight, of pigment based on the total composition, is appropriately added. Suitable pigments are the known compounds conventionally used in the dye and printing ink industry, for example organic pigments, e.g. pigment and dyes of the azo series, complex pigments and dyes, anthraquinone dyes and quinacridone pigments, carbon black and inorganic pigments e.g. titanium dioxide, iron oxide and cadmium sulphide selenide. The pigments may be incorporated using conventional apparatus used in the dye and printing ink industries, e.g. with a triple roller mill.

The binders according to the invention may also be combined with other resin binders in order to obtain certain special properties for example in amounts of up to 60% by weight, preferably 3 to 20% by weight, based on the total composition. Resins with which the binders according to the invention may be combined include, for example, acrylated epoxy resins, unsaturated polyesters, acrylamide containing systems, alkyd resins, cyclorubber, hydrocarbon resins based, for example, on cyclo- or dicyclopentadiene, colophony, acrylate and/or maleate resins, phenol-modified colophony resins provided that they are high-melting types compatible with aliphatics, and phenolic resins. Maleate resins, for example, may be added to printing inks to improve the processing characteristics in offset machines, without negatively affecting the drying speed.

The following Examples serve to illustrate the polyester binders according to the invention. The preparation of the binders and of printing inks containing them was carried out as follows:

PREPARATION OF BINDERS

Step 1

The carboxylic acid and the alcohol components are intimately mixed with the polycyclic compound and any other additive in a flask fitted with a stirrer, thermometer and water separator, and the mixture is kept at a temperature in the range from 160° to 250° C., with stirring, until the theoretical quantity of water has separated off.

Step 2

The polyester resin formed in the step 1 is dissolved in an azeotropic dehydrating agent and the acrylic compound, an inhibitor and catalyst are added. The mixture is heated to 70°–120° C. and the azeotropic dehydrating agent is then distilled off, if necessary under reduced pressure. After removal of water by azeotropic distillation, the dehydrating agent is recycled into the reaction mixture. The catalyst is then washed out of the resin solution in known manner, after which solvent is distilled off under reduced pressure at 50° to 70° C.

In the following Examples, T indicates parts by weight.

EXAMPLE 1

472 T of hexanediol-1,6 are condensed with 876 T of adipic acid and 80 T of a compound of formula I at 200° C. under the aforespecified conditions. 132 T of water are separated off. 100 T of the resin produced (acid number 210) are dissolved in 150 T of toluene and 43.4 T of 2-hydroxyethyl acrylate, 0.75 T of 2,6-di-tert-.butylcresol and 1.5 T of conc. sulphuric acid are added. The mixture is reacted at 95° C. under slightly reduced pressure. After separation of the water formed the solvent is distilled off under reduced pressure, and a slightly yellowish resin with a viscosity of 720 P is obtained.

EXAMPLE 2

118 T of hexanediol-1,6 are condensed with 124 T of ethyleneglycol, 292 T of adipic acid and 36 T of a compound of formula I at 200° C. 75 T of water are separated. 100 T of the resin produced (OH number 450) are dissolved in 150 T of toluene, and 60 T of N-methylolacrylamide, 1.5 T of 2,6-di-tert,butylcresol and 2.0 T of conc. sulphuric acid are added. The mixture is reacted at 95° C. under slightly reduced pressure. After separation of the water formed, the mixture is worked up as in Example 1, and a slightly yellowish resin with a viscosity of 850 P is obtained.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

We claim:

1. An unsaturated polyester which comprises a reaction product of, in a first step,
    (A) at least one compound selected from the group consisting of $\alpha,\beta$-mono-olefinically unsaturated dicarboxylic acids, polycarboxylic acids free from polymerisable, carboncarbon multiple bonds and functional derivatives thereof
    (B) at least one polyhydric alcohol, and
    (C) at least one tricyclo-$(5,2,1,0^{2,6})$-decane derivative in an amount of 0.5 to 30% by weight on the polyester resin, said tricyclo-(5,2,1,0$^{2,6}$)-decane derivative being substituted by hydroxyl, carboxy, or amino groups, to thereby form an intermediate polyester having reactive hydroxy or carboxyl groups and in a separate second stage, (D) at least one acrylic compound containing hydroxy groups which is reacted through said hydroxy groups with the polyester intermediate products of components (A) to (C) and is selected from the group consisting of hydroxyl alkyl esters of acrylic acid, hydroxy alkyl esters of methyacrylic acid, both having up to three carbon atoms in the hydroxyalkyl group, N-alkylol-methacrylamides and N-alkylol-acrylamides, both containing up to four carbon atoms in the alkylol group in the presence of a polymerisation inhibitor in an amount of from 0.1 to 5%, referred to the weight of the reaction components (A) to (D) at a temperature in the range from 70° to 120° C.

2. A polyester as claimed in claim 1 wherein the polyhydric alcohol (B) has only primary alcohol groups.

3. A polyester as claimed in claim 1 wherein compound (C) contains a carbon-carbon double bond in a 5-membered ring fused to the norbornane ring system and is present in an amount of at least 0.5% by weight, referred to the polyester.

4. A polyester as claimed in claim 1 wherein the content of acrylic compound (D) is from 10 to 50% by weight, referred to the polyester.

5. A process for the preparation of a polyester as claimed in claim 4 wherein in a first reaction step:
(a) at least one compound selected from the groups consisting of α,β-mono-olefinically unsaturated dicarboxylic acids free from polymerisable carbon-carbon multiple bonds and functional derivatives thereof,
(b) at least one polyhydric alcohol and
(c) at least one tricyclo-(5,2,1,0$^{2,6}$)-decane derivative in an amount of 0.5 to 30% by weight based on the polyester resin, said tricyclo-(5,2,1,0$^{2,6}$)-decane derivative being substituted by hydroxyl, carboxyl or amino groups, are reacted together to thereby form an intermediate polyester having reactive hydroxy or carboxyl groups followed by a separate second reaction step with:
(d) at least one acrylic compound containing hydroxy groups which is reacted through said hydroxy groups with the intermediate polyester of components (a) to (c) and is selected from the groups consisting of hydroxyalkyl esters of acrylic acid, hydroxy alkyl esters of methacrylic acid, both having up to three carbon atoms in the hydroxy alkyl group, N-alkylolacrylamides and N-alkylolmethacrylamides, both containing up to four carbon atoms in the alkylol group in the presence of a polymerisation inhibitor in an amount of from 0.1 to 5%, referred to the weight of the reaction components (a) to (d) at a temperature in the range from 70° to 120° C.

6. A process as claimed in claim 5 wherein the first step is effected at a temperature in the range from 160° to 250° C.

7. A process as claimed in claim 5 wherein the second step is performed in the presence of a catalyst in an amount of from B 0.1 to 5%, referred to the weight of the reaction components (A) to (D).

8. A process as claimed in claim 5 wherein the second step is performed under reduced pressure in the presence of an entrainer.

9. A process as claimed in claim 5 a polyester product of the first reaction step having a hydroxy number in the range from 100 to 1000 and is partially etherified in the second step with component (D) to yield a product in which at least 2% of the hydroxy groups of the polyester remain unreacted.

10. A process as claimed in claim 5 wherein a polyester product of the first reaction step having an acid number in the range from 100 to 800 and is partially esterified in the second step with component (D) to yield a product in which at least 2% of the carboxyl groups of the polyester remain unreacted.

11. A coating composition which comprises as a binder an unsaturated polyester as claimed in claim 1.

12. A coating composition which comprises as a binder an unsaturated polyester as claimed in claim 11 in admixture with at least one further ingredient selected from the group consisting of reactive diluents, sensitizers, pigments and further synthetic resins.

13. A coating composition which comprises as a binder an unsaturated polyester as claimed in claim 14 in admixture with pigments.

14. A composition as claimed in claim 12 as printing ink.

15. An unsaturated polyester which comprises a reaction product of, in a first phase,
(A) at least one polycarboxylic acid free from polymerisable carbon-carbon multiple bonds,
(B) at least one polyhydric alcohol, and
(C) at least tricyclo-(5,2,1,0$^{2,6}$)-decane derivative in an amount of 0.5 to 30% by weight based on the polyester tricyclo-(5,2,1,0$^{2,6}$)-decane derivative being substituted by hydroxyl, carboxyl or amino groups, to thereby form an intermediate polyester having reactive hydroxy or carboxyl groups, and in a separate stage
(D) at least one N-alkylol-acrylamide containing up to four carbon atoms in the alkylol group with the polyester intermediate products of components (A) to (C) through the hydroxy groups of the acrylic compound in the presence of a polymerisation inhibitor in an amount of from 0.1 to 5%, referred to the weight of the reaction components (A) to (D) at a temperature in the range from 70° to 120° C.

16. A process for the preparation of a binder as claimed in claim 5 based on an unsaturated polyester wherein in a first reaction step:
(A) at least one polycarboxylic acid free from polymerisable carbon-carbon multiple bonds,
(B) at least one polyhydric alcohol and
(C) at least one tricyclo-(5,2,1,0$^{2,6}$)-decane derivative in an amount of 0.5 to 30% based on the polyester resin and having at least one carboxylic substituent, are reacted together to thereby form an intermediate polyester having reactive hydroxy or carboxyl groups followed by a separate second reaction step with
(D) at least one N-alkylol-acrylamide containing up to four carbon atoms in the alkylol group which is reacted therewith through the hydroxy groups of the N-alkylolacrylamide in the presence of a polymerisation inhibitor in an amount of from 0.1 to 5%, referred to the weight of the reaction components (A) to (D) at a temperature in the range of from 70° to 120° C.

17. An unsaturated polyester which comprises a reaction product of, in the first stage
   (A) at least one polyhydric acid free from polymerisable carbon-carbon multiple bonds and functional derivatives thereof,
   (B) at least one polyhydric alcohol, and
   (C) at least one tricyclo-(5,2,1,0$^{2,6}$)-decane derivative and being substituted by at most two carboxyl groups to thereby form an intermediate polyester having reactive carboxyl groups and in a separate second stage
   (D) at least one acrylic compound containing hydroxy groups which is reacted through said hydroxy groups with the polyester intermediate products of components (A) to (C) and is selected from the group consisting of hydroxyl alkyl esters of acrylic acid, hydroxy alkyl esters of methacrylic acid, both having up to three carbon atoms in the hydroxyalkyl group, N-alkylol-methacrylamides and N-alkylol-acrylamides, both containing up to four carbon atoms in the alkylol group in the presence of a polymerisation inhibitor in an amount of from 0.1 to 5%, referred to the weight of the reaction components (A) to (D) at a temperature in the range from 70° to 120° C.

18. A polyester as claimed in claim 1 wherein component (A) is modified by at least one component selected from the group consisting of benzophenones substituted by at least one carboxyl group, fatty oils, saturated fatty acids and unsaturated fatty acids up to 30% by weight, referred to the acid component (A).

* * * * *